(12) United States Patent
Chern et al.

(10) Patent No.: US 6,216,896 B1
(45) Date of Patent: Apr. 17, 2001

(54) METHOD OF PREPARING A FOSSIL MOLDING

(76) Inventors: Mann-Hwang Chern; Li-Sung Chiang; Kuo Yao-Te, all of No. 8, Alley 10, Lane 68, Chung-Shin South St., San-Chong, Taipei Hsien (TW)

(*) Notice: Subject to any disclaimer, the term of this patent is extended or adjusted under 35 U.S.C. 154(b) by 0 days.

(21) Appl. No.: 09/212,416

(22) Filed: Dec. 16, 1998

(30) Foreign Application Priority Data

Jan. 23, 1998 (TW) .................................................. 87100998

(51) Int. Cl.[7] ........................... B29C 33/50; B29C 39/12; B29C 41/22; B29C 67/04
(52) U.S. Cl. .......................... 214/642; 264/113; 264/256; 264/313; 264/643; 264/670; 264/679
(58) Field of Search ..................................... 264/256, 642, 264/643, 652, 679, 313, 319, 113, 670

(56) References Cited

U.S. PATENT DOCUMENTS 2,147,770 * 2/1939 Ford ...................................... 264/643
3,769,114 * 10/1973 Weigert .................................. 156/59
3,917,786 * 11/1975 Weigert .................................. 264/129

* cited by examiner

Primary Examiner—Jan H. Silbaugh
Assistant Examiner—Michael I. Poe
(74) Attorney, Agent, or Firm—Bacon & Thomas

(57) ABSTRACT

A fossil molding fabrication method includes the steps of (1) preparing a fossil skeleton material; (2) mixing the fossil skeleton material with water to form a paste-like fossil skeleton material, then filling the paste-like fossil skeleton material in the cavity of a flexible mold; (3) preparing a base rock material, then mixing the base rock material with water to form a paste-like base rock material, and then covering the paste-like base rock material over the fossil skeleton in the flexible mold; and (4) keeping the paste-like base rock material away from the radiation of the sun and letting it be dried in the air, and then removing the molding thus formed from the mold, so as to obtain a fossil molding. A cover rock may be covered on the base rock over the fossil skeleton.

6 Claims, 2 Drawing Sheets

METHOD OF PREPARING A FOSSIL MOLDING

BACKGROUND OF THE INVENTION

The present invention relates to fossil moldings and preparation thereof.

Fossil studying is an important subject in archeology. Gathering fossils is an interesting thing to many people. However, it is not easy to obtain a fossil. This problem obstructs the promotion of fossil research and study. The study of ancient living things begins when ancient fossil dinosaurs were discovered. In the past, only archeologists have chance of contacting fossil dinosaurs. Ordinary people can observe archeologists in discovering fossils only through books, television or video tapes. Few people have the chance of enjoying the discovery of a fossil. It is meaningful to provide fossil moldings for ordinary people to see and enjoy, or to study. It is more meaningful to provide a fossil molding having a fossil animal or plant raised from a base rock and covered with a cover rock. A fossil molding of this kind enables people to enjoy the happiness of discovering a fossil.

SUMMARY OF THE INVENTION

It is one object of the present invention to provide a fossil molding that can be made through a mass production process economically. It is another object of the present invention to provide a fossil molding that can be made of different materials through a mass production process. It is still another object of the present invention to provide a fossil molding which has a cover rock that can be scraped away by the consumer, enabling the consumer to enjoy the happiness of discovering a fossil. The preparation of the fossil molding includes three stages, namely, the first stage of the preparation of a fossil skeleton semi-finished product, the second stage of the preparation of a primarily finished product having a fossil skeleton raised from a base rock, and the third stage of the preparation of a secondarily finished product having a cover rock covered on the fossil skeleton. A fossil skeleton semi-finished product is made by selecting a fossil skeleton material, then mixing the selected material with water to form a paste-like material, and then filling the paste-like material in the cavity of a flexible mold, enabling it to be molded into a fossil skeleton semi-finished product. The material can be selected from (a) the mixture of pot earth and red earth, (b) the mixture of white cement and quartz sands, or (c) the mixture of unsaturated resin, calcium carbonate and pigment. The fossil skeleton can be the skeleton of a dinosaur, shell, fish, etc., of any of a variety of sizes. The flexible mold can be, for example, a silicon rubber mold for easy stripping. It is not necessary to remove the molding of the fossil skeleton semi-finished product from the mold during the first stage. A primarily finished product is made by: mixing a base rock material with water to form a paste-like material, then covering the paste-like material on the mold obtained from the aforesaid first stage over the fossil skeleton to the desired thickness, then letting the paste-like material be dried in the air without radiation of the sun. The base rock material can be selected from (a) the mixture beach sands, pot earth and red earth, (b) the mixture of gray cement and black sands, or (c) the mixture of unsaturated resin and black sands. In case the fossil skeleton material is obtained from the mixture of pot earth and red earth, and the base rock material is obtained from the mixture of beach sands, pot earth and red earth, the fossil molding thus obtained must be roast-sintered at 1000° C.~1500° C. A secondarily finished is made by: preparing a cover rock material by mixing black sands, gypsum and red earth into a mixture, then mixing the mixture thus obtained with water to form a paste-like cover rock material, and then covering the paste-like cover rock material on the primarily finished product to the desired thickness, and then letting the paste-like cover rock material be dried in the air without radiation of the sun, so as to obtain a cover rock covered fossil molding. Because the cover rock is softer than the fossil skeleton and the base rock, it can easily be scraped away from the fossil skeleton without causing damage to the fossil skeleton.

DETAILED DESCRIPTION OF THE PREFERRED EMBODIMENT

Figure 1:
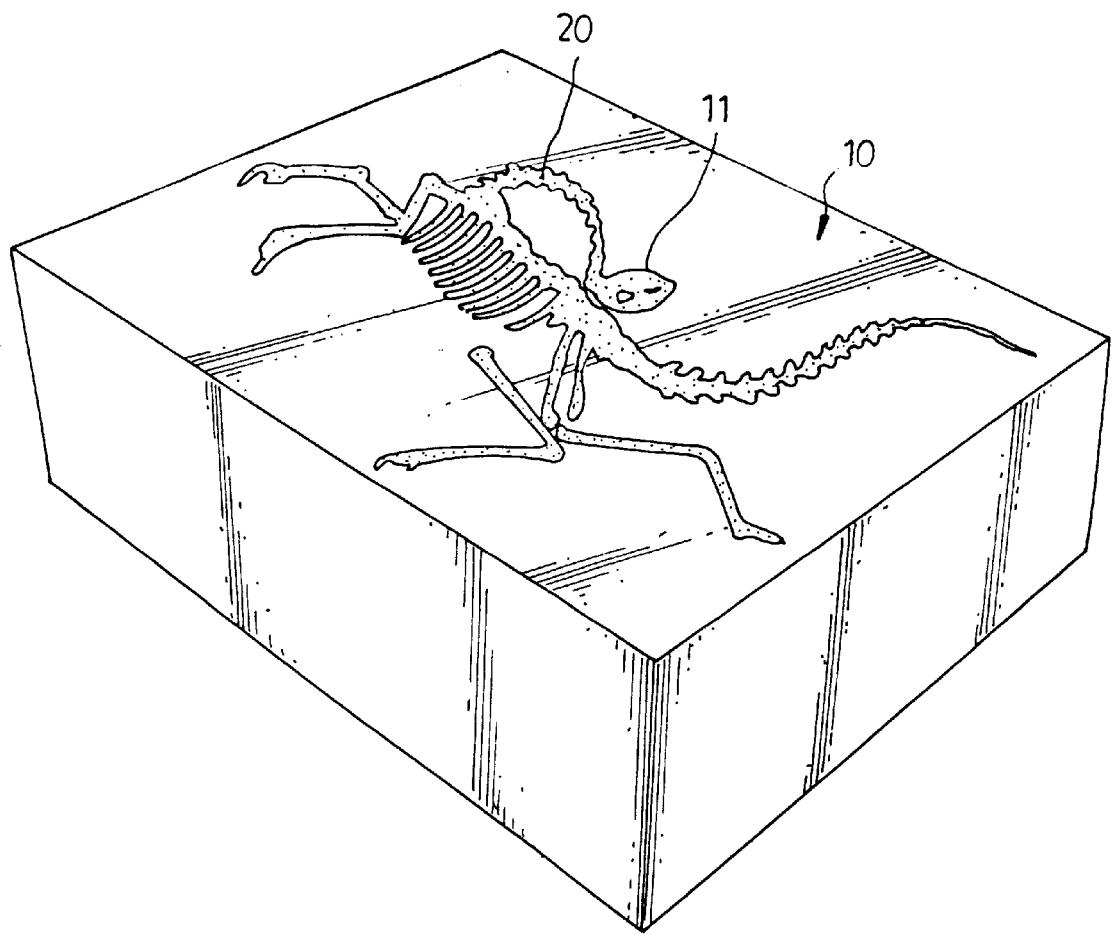
FIG. 1 illustrates a fossil dinosaur skeleton molded in the cavity of a flexible silicon rubber mold.

Referring to FIG. 1, a fossil skeleton (or a dinosaur) 20 is made by: mixing fossil skeleton material with water to form a paste, then filling the paste in the cavity 11 of a flexible silicon rubber mold 10, then scraping the surface of the mold 10 with scraper means.

Figure 2:
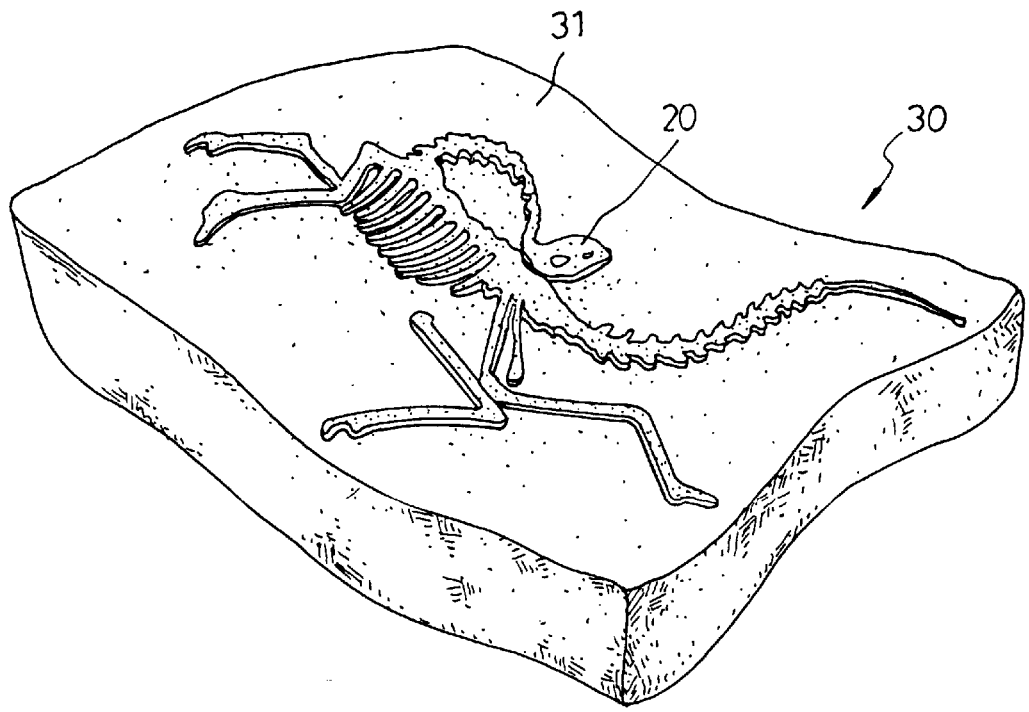
FIG. 2 illustrates a fossil dinosaur skeleton raised from a base rock according to the present invention.

Referring to FIG. 2 and FIG. 1 again, a primarily finished product 30 is made by: mixing a base rock material with water to form a paste, then covering the paste on the mold 10 over the fossil skeleton 20 to the desired thickness, then letting the paste be dried in the air without radiation of the sun. The primarily finished product 30 shows the fossil skeleton 20 raised from a base rock 31.

Figure 3:
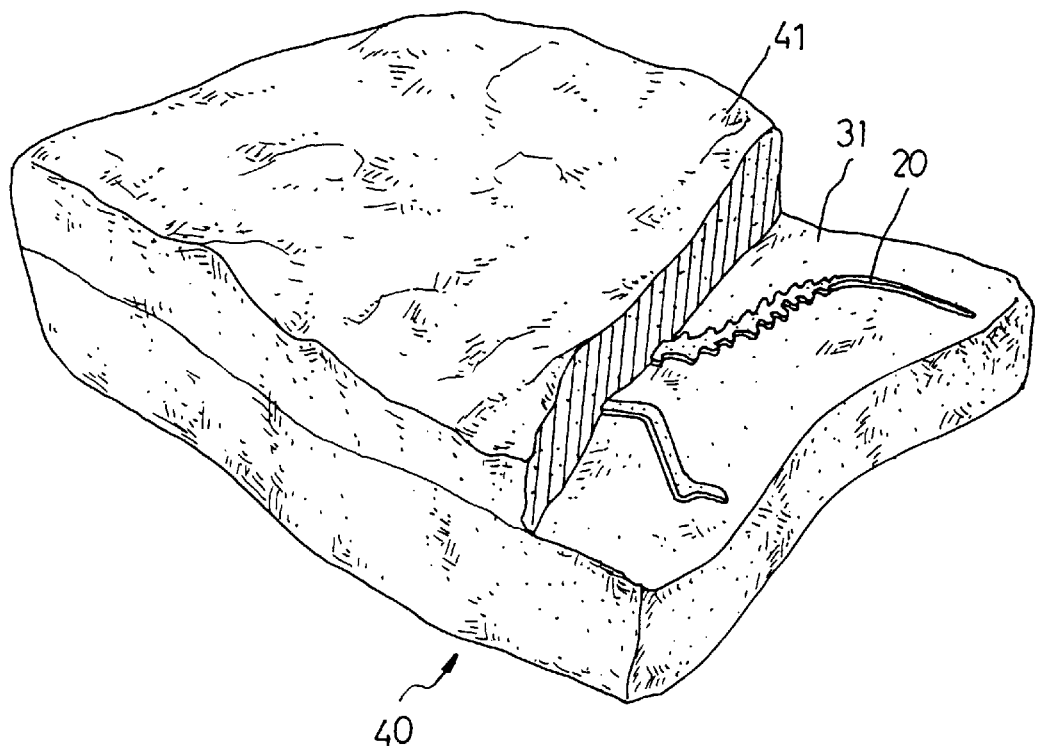
FIG. 3 illustrates a cover rock covered on the base rock over the fossil dinosaur skeleton according to the present invention.

Referring to FIG. 3 and FIG. 2 again, a secondarily finished product 40 is made by: mixing cover rock material with water to form a paste, then covering the paste on the primarily finished product 30 over a part of the fossil skeleton 20, then letting the paste be dried in the air without radiation of the sun. The secondarily finished product 40 shows a cover rock 41 covered on the base rock 31 over a part of the skeleton 20.

In order to enjoy the happiness of discovering a fossil dinosaur, the consumer can use a tool to remove the cover rock 41 from the base rock 31, enabling the fossil skeleton 20 to be exposed to the outside. The cover rock 41 is softer than the base rock 31. Therefore the cover rock 41 can easily be removed from the base rock 31 without causing damage to the fossil skeleton 20.

Examples of the present invention are described hereinafter. In the following examples, the parts are measured by weight, the temperature is measured by ° C., the weight measuring unit is kilogram, and the volume measuring unit is cubic millimeters.

EXAMPLE I

Preparation of ceramic fossil dinosaur molding
(1) Preparation of fossil skeleton Mix 95 parts of pot earth with 5 parts of red earth to form a fossil skeleton material. Then, mix the fossil skeleton material thus obtained with water to form a paste-like fossil skeleton material. Then, fill the paste-like fossil skeleton material in the cavity of a flexible silicon rubber mold, and then scrape the surface of the mold with scraper means.

(2) Preparation of base rock

Mix 45 parts of beach sands, 45 parts of pot earth and 10 parts of red earth to form a base rock material. Then, mix the base rock material thus obtained with water to form a paste-like base rock material. Then, cover the paste-like base rock material over the fossil skeleton molded in the mold of step (1) to the desired thickness, and then let the paste-like base rock material be dried in the air without radiation of the sun. Then, remove the molding from the mold, so as to obtain a blank of fossil dinosaur.

(3) Roast-sintering

The blank of fossil dinosaur obtained from step (2) is put in a roast-sintering kiln, and roast-sintered at 1250° C., and a fossil dinosaur molding (primarily finished product) is thus obtained. As illustrated in FIG. 2, the fossil dinosaur skeleton is raised from the base rock.

(4) Preparation of cover rock

Mix 65 parts of black sands, 30 parts of gypsum and 5 parts of red earth to form a cover rock material. Then, mix the cover rock material thus obtained with water to form a paste-like cover rock material. Then, cover the paste-like cover rock material on the fossil dinosaur molding (primarily finished product) obtained from step (3) to the desired thickness, and then let the paste-like cover rock material be dried in the air without radiation of the sun, so as to obtain a cover rock covered fossil dinosaur molding (secondarily finished product).

EXAMPLE II

Preparation of cement fossil dinosaur molding (1) Preparation of fossil skeleton Mix 25 parts of white cement and 75 parts of quartz sands to form a fossil skeleton material. Then, mix the fossil skeleton material thus obtained with water to form a paste-like fossil skeleton material. Then, fill the paste-like fossil skeleton material in the cavity of a flexible silicon rubber mold, and then scrape the surface of the mold with scraper means.

(2) Preparation of base rock

Mix 25 parts of gray cement and 75 parts of blank sands to form a base rock material. Then, mix the base rock material thus obtained with water to form a paste-like base rock material. Then, cover the paste-like base rock material over the fossil skeleton molded in the mold of step (1) to the desired thickness, and then let the paste-like base rock material be dried in the air without radiation of the sun. Then, remove the molding from the mold, so as to obtain a blank of fossil dinosaur.

(3) Preparation of cover rock

Mix 65 parts of black sands, 30 parts of gypsum and 5 parts of red earth to form a cover rock material. Then, mix the cover rock material thus obtained with water to form a paste-like cover rock material. Then, cover the paste-like cover rock material on the fossil dinosaur molding (primarily finished product) obtained from step (3) to the desired thickness, and then let the paste-like cover rock material be dried in the air without radiation of the sun, so as to obtain a cover rock covered fossil dinosaur molding (secondarily finished product).

EXAMPLE III

Preparation of resin fossil dinosaur molding (1) Preparation of fossil skeleton

Mix 30 parts unsaturated resin (containing a small amount of hardening agent), 60 parts of calcium carbonate and 10 parts of yellow pigment to form a fossil skeleton material. Then, mix the fossil skeleton material thus obtained with water to form a paste-like fossil skeleton material. Then, fill the paste-like fossil skeleton material in the cavity of a flexible silicon rubber mold, and then scrape the surface of the mold with scraper means.

(2) Preparation of base rock

Mix 15 parts of unsaturated resin (containing a small amount of hardening agent) and 85 parts of black sands to form a base rock material. Then, mix the base rock material thus obtained with water to form a paste-like base rock material. Then, cover the paste-like base rock material over the fossil skeleton molded in the mold of step (1) to the desired thickness, and then let the paste-like base rock material be dried in the air without radiation of the sun. Then, remove the molding from the mold, so as to obtain a blank of fossil dinosaur.

(3) Preparation of cover rock

Mix 65 parts of black sands, 30 parts of gypsum and 5 parts of red earth to form a cover rock material. Then, mix the cover rock material thus obtained with water to form a paste-like cover rock material. Then, cover the paste-like cover rock material on the fossil dinosaur molding (primarily finished product) obtained from step (3) to the desired thickness, and then let the paste-like cover rock material be dried in the air without radiation of the sun, so as to obtain a cover rock covered fossil dinosaur molding (secondarily finished product).

It is to be understood that the drawings are designed for purposes of illustration only, and are not intended as a definition of the limits and scope of the invention disclosed.

What the invention claimed is:

1. A process for preparing a fossil molding comprising the steps of:

i) preparing a fossil skeleton material from a mixture selected from the group consisting of a mixture of pot earth and red earth, a mixture of white cement and quartz sands, and a mixture of unsaturated resin, calcium carbonate and pigment;

ii) mixing the fossil skeleton material with water to form a paste fossil skeleton material;

iii) filling a cavity of a flexible mold with the paste fossil skeleton material to provide a fossil skeleton molding iv) preparing a base rock material from a mixture selected from the group consisting of a mixture of beach sands, pot earth and red earth, a mixture of gray cement and black sands, and a mixture of unsaturated resin and black sands;

v) mixing the base rock material with water to form a paste base rock material;

vi) covering the fossil skeleton molding in the flexible mold obtained from step iii) with the paste base rock material to a desired thickness;

vii) air drying the paste base rock material covering the fossil skeleton molding without sunlight radiation to provide a fossil molding;

viii) removing the fossil molding from the mold.

2. The process of claim 1 further comprising the steps of:

ix) preparing a cover rock material by mixing black sands, gypsum and red earth into a mixture;

x) mixing the cover rock material with water to form a paste cover rock material;

xi) covering the fossil molding obtained from step viii) with the paste cover rock material to a desired thickness; and xii) air drying the paste cover rock material covering the fossil molding without sunlight radiation to obtain a cover rock covered fossil molding.

3. The process of claim 1 wherein the fossil skeleton material is a mixture of pot earth and red earth, the base rock material is a mixture of beach sands, pot earth and red earth, and the fossil molding thus obtained from step viii) is roast-sintered at 1000° C. to 1500° C.

4. The process of claim 1 wherein the fossil skeleton material is a mixture of white cement and quartz sands, and the base rock material is a mixture of gray cement and black sands.

5. The process of claim 1 wherein the fossil skeleton material is a mixture of unsaturated resin, calcium carbonate and pigment, and the base rock material is a mixture of unsaturated resin and black sands.

6. A process for preparing a fossil molding comprising the steps of:

i) preparing a fossil skeleton material from a mixture selected from the group consisting of a mixture of pot earth and red earth, a mixture of white cement and quartz sands, and a mixture of unsaturated resin, calcium carbonate and pigment;

ii) mixing the fossil skeleton material with water to form a paste fossil skeleton material;

iii) filling a cavity of a flexible mold with the paste fossil skeleton material to provide a molded paste fossil skeleton material;

iv) keeping the molded paste fossil skeleton material away from sunlight radiation and air drying said molded paste fossil skeleton material to obtain a fossil molding;

v) preparing a cover rock material by mixing black sands, gypsum and red earth into a mixture;

vi) mixing the cover rock material with water to form a paste cover rock material;

vii) covering the fossil molding obtained from step iv) with the paste cover rock material to a desired thickness; and viii) air drying the paste cover rock material covering the fossil molding without sunlight radiation to obtain a cover rock covered fossil molding.

* * * * *